Figure 1:
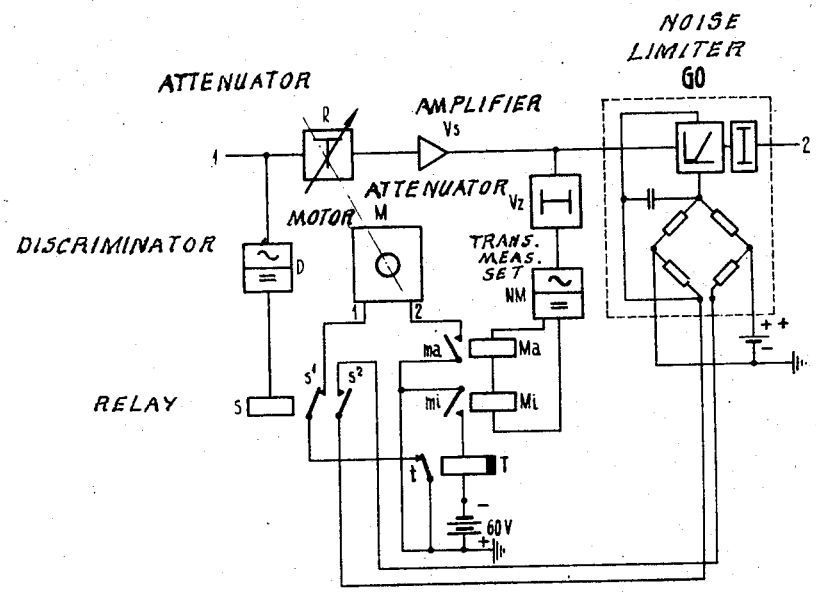

Jan. 6, 1959   C. BEVOORT ET AL   2,867,688
AUTOMATIC VOLUME REGULATOR
Original Filed May 26, 1951   6 Sheets-Sheet 1

INVENTORS.
Cornelis Bevoort
Raimond Edouard Marie Baudet
By ............
Atty's.

Jan. 6, 1959  C. BEVOORT ET AL  2,867,688
AUTOMATIC VOLUME REGULATOR
Original Filed May 26, 1951  6 Sheets-Sheet 2
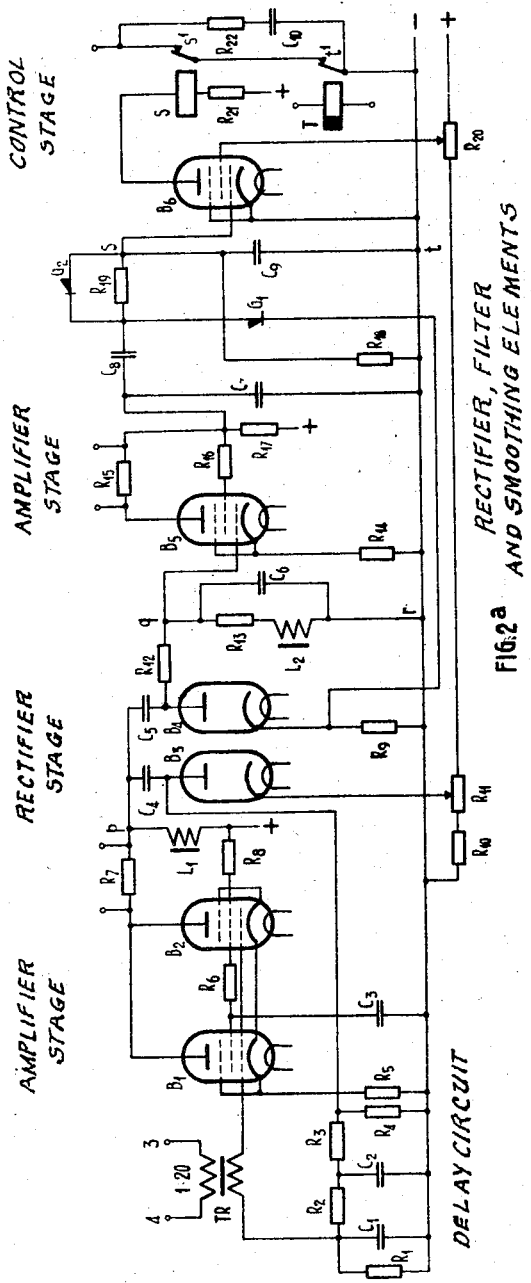
INVENTORS.
Cornelis Bevoort
Raimond Edouard Marie Baudet
By Burns Jackson Boettcher & Dunner
Attys.

Jan. 6, 1959

C. BEVOORT ET AL 2,867,688

AUTOMATIC VOLUME REGULATOR

Original Filed May 26, 1951

6 Sheets-Sheet 3

INVENTORS.

Cornelis Bevoort
Raimond Edouard Marie Baudet

By

Atty's.

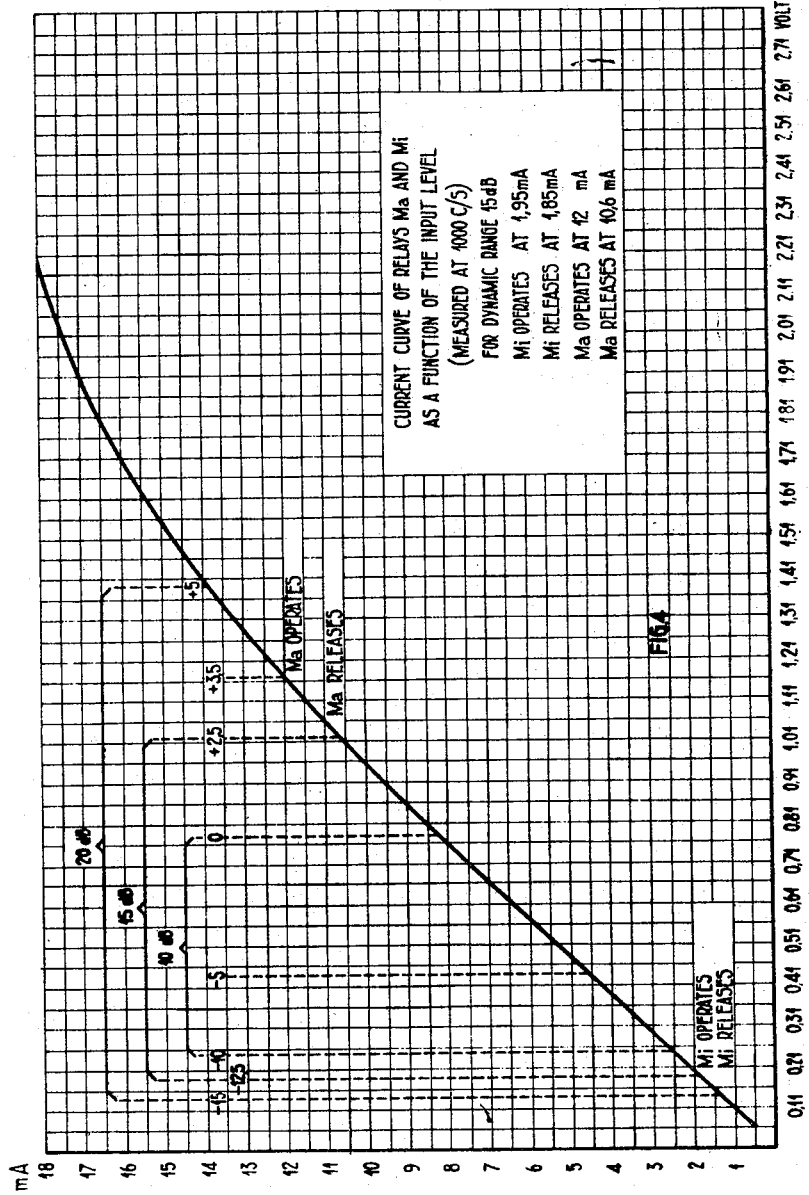

Jan. 6, 1959     C. BEVOORT ET AL     2,867,688
AUTOMATIC VOLUME REGULATOR
Original Filed May 26, 1951     6 Sheets-Sheet 5

Jan. 6, 1959

C. BEVOORT ET AL 2,867,688

AUTOMATIC VOLUME REGULATOR

Original Filed May 26, 1951

6 Sheets-Sheet 6

INVENTORS.
Cornelis Bevoort
Raimond Edouard Marie Baudet 2,867,688
Patented Jan. 6, 1959

United States Patent Office 2,867,688

AUTOMATIC VOLUME REGULATOR

Cornelis Bevoort and Raimond Edouard Marie Baudet, The Hague, Netherlands, assignors to Staatsbedrijf der Posterijen, Telegrafie en Telefonie, The Hague, Netherlands Original application May 26, 1951, Serial No. 228,394. Divided and this application March 18, 1957, Serial No. 649,270

Claims priority, application Netherlands June 16, 1950

9 Claims. (Cl. 179—1)

The invention relates to a system for automatic control of the speech current level, e. g. at the output of a radio-receiver.

A device of this kind has been described in the application which was filed on May 26, 1951, by Bevoort et al. and assigned Serial No. 228,394, and of which the present application is a division. This type equipment was also disclosed in the U. S. A. patent application No. 189,412.

A characteristic of this system is the simple manner in which the output level can be regulated. A transmission measuring set, usually called TMS connected to the output controls minimum and maximum relays, contacts of which switch in a motor for adjusting an adjustable attenuator at the input of the apparatus.

The system of the invention intends to procure an automatic volume regulator which is in a high degree independent of the occurrence of noise, whistling, etc. This result has been secured by means of a device which determines the presence of speech of usable level which particularly responds to telephone currents occurring in the mixture of alternating currents applied to the input.

This device, which will be called discriminator hereinafter, consists of a preamplifier, a first rectifier, an amplifier, a second rectifier and a relay; in this arrangement the rectification and smoothing of the speech currents obtained from the preamplifier yield a voltage varying in a syllabic rhythm, which voltage, after amplification once more rectified, controls, accordingly as there are telephone currents present at the input or not, a relay inserted in the anode circuit of the terminal tube, the action of the said relay being delayed by appropriate means, so that between the syllables the armature is not actuated, whereas by the application of delayed automatic volume control in the said preamplifier the switching times are independent of the signal level.

Another characteristic of the invention is such an arrangement that in the absence of speech of usable level the discriminator switches off the motor regulator before the minimum relay of the TMS has released, and that when telephone currents arrive again, the latter relay closes its contact again before the discriminator relay releases. As a result an undesired start of the motor, perhaps in a wrong direction, is avoided.

According to the invention the discriminator is insensible to noises of short duration, as the discriminator relay is prevented from attracting its armature as long as the preamplifier has not yet found its correct adjustment. The means by which this is achieved will be described hereinafter.

According to a further characteristic of the invention the discriminator controls at the same time a noise limiting device at the output, such, that the noise limiter is switched in for increasing the attenuation in the circuit when the speech disappears.

Figure 3:
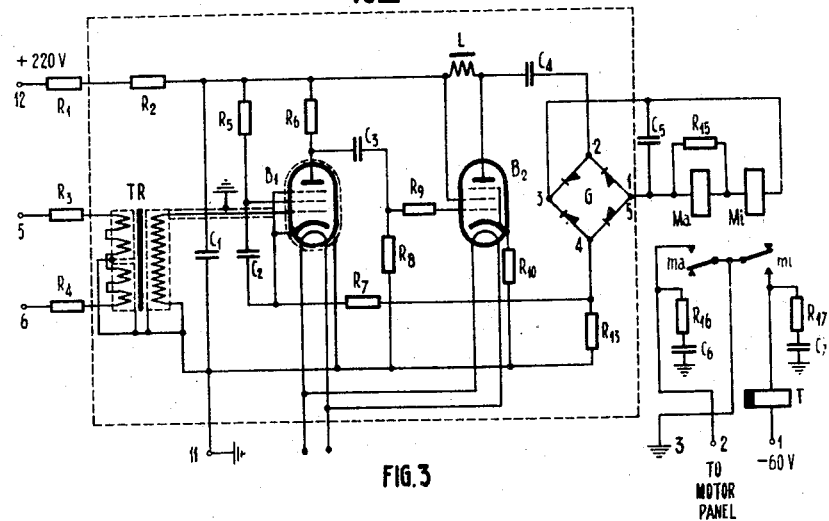
Figure 2B:
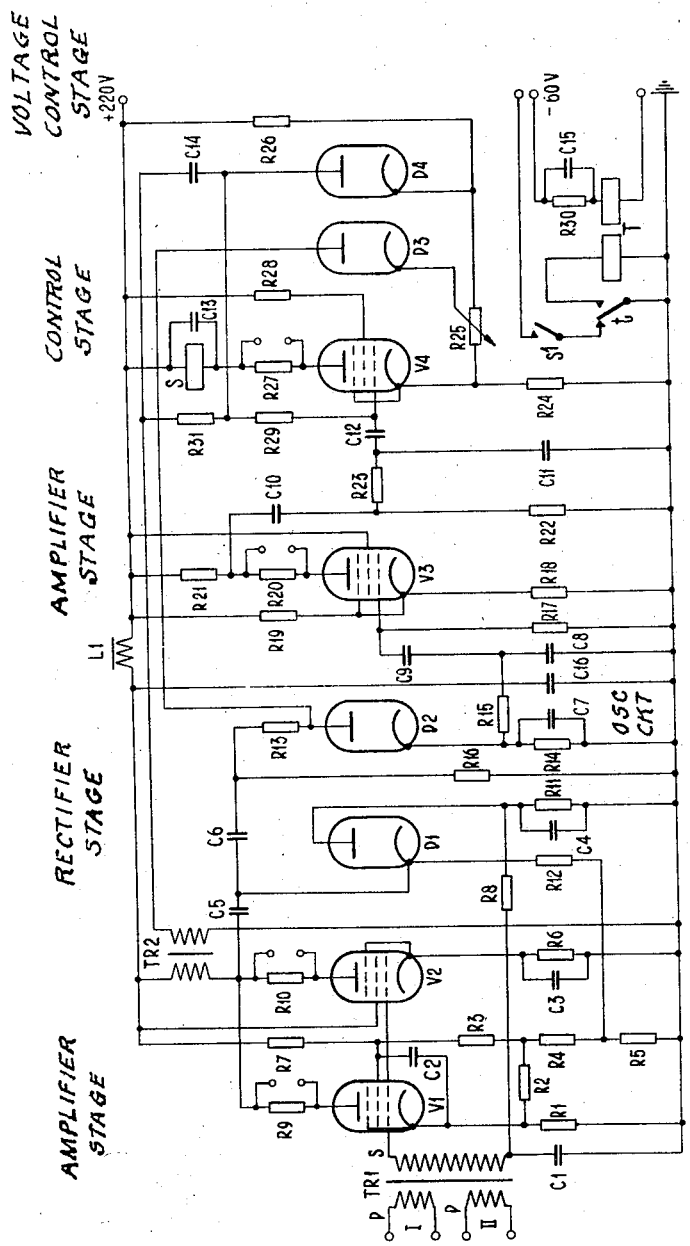
Figure 6:
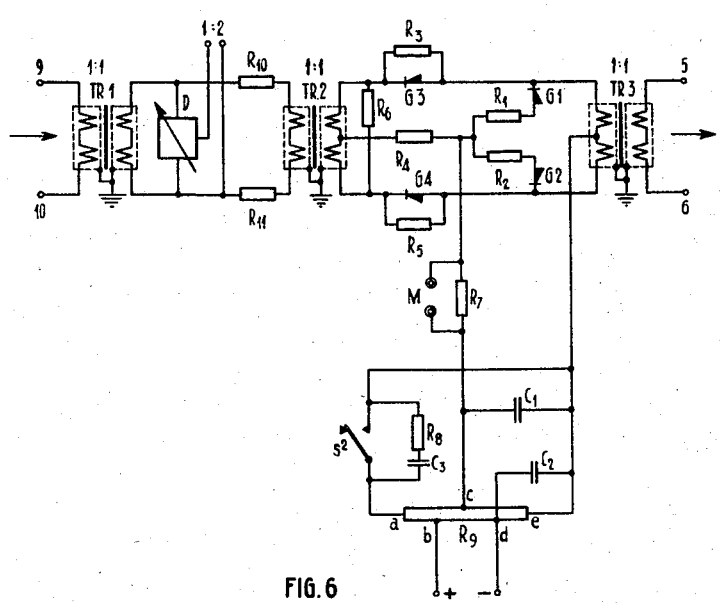

The invention will be explained by means of the annexed drawing, which shows, by way of example, some embodiments, viz:

Fig. 1 a general view of the automatic volume regulator;
Fig. 2a an embodiment of the discriminator;
Fig. 2b another embodiment of the discriminator;
Fig. 3 the transmission measuring set;
Fig. 4 a graph illustrating the operation of the TMS;
Fig. 5 the arrangement of the motor circuit of the regulator;
Fig. 6 the noise limiter.

Suppose the circuit 1 to be connected to a radio-receiver. It is prolonged via an adjustable attenuator R, an amplifier Vs, a noise limiter Go and the circuit 2. The radio receiver is e. g. a receiver in a commercial communication and may be located in a receiving centre. Circuit 1—2 is the beginning of the incoming circuit (half of a four-wire circuit) to a four-wire termination set in the telephone exchange, whence a two-wire circuit leads to the subscriber's premises, the other half of the four-wire circuit leading to a transmitting centre.

The discriminator D, which is connected in parallel to the input, will only demagnetize relay S in case there arrives speech of usable level. In the chosen example the limits for commercial input level at 1 lie between +6 and −34 db. Relay S of the discriminator interrupts the motor circuit, so that for speech arriving anew the same adjustment is maintained.

The transmission measurement set NM connected via an attenuator Vz in parallel to the output of amplifier Vs determines, in the absence of speech of usable level, the necessity of re-adjustment. The input level of this device lies e. g. at −5 db, so that by giving attenuator Vz a suitable attenuation value, e. g. of 11 db., the output level can be kept constant at 6 db. By re-adjusting the attenuator Vz any desired value can be easily obtained.

In case the level is too high or too low the TMS will energize its maximum relay MA, or cause the release of its minimum relay Mi, respectively. In both cases the motor regulator MR is switched in, but in opposite directions. In the case of a too low level the motor regulator is not immediately switched in by relay Mi, but by the intermediary of a slowly releasing relay T. This is necessary in order to give the discriminator the time to interrupt the motor circuit in the absence of speech of usable level, in which case the regulator should not operate. This relay T, however, should operate quickly in order to prevent the motor from being switched in when the discriminator relay releases as a result of newly arriving speech.

Fig. 2a gives a diagram of the discriminator. The A. C. voltages found in circuit 1 (Fig. 1) are applied to the primary of transformer TR (points 3 and 4). The voltages developing across the secondary winding are applied between the grids and cathodes of two tubes B1 and B2, which are connected in parallel. As the discriminator should work at level of from +6 to −40 db one amplifier tube proved insufficient. In order to obtain a certain AVC in this tube arrangement, the voltage variations which develop across the self-inductor in the anode circuit are applied via condenser C4 to diode B3. The cathode of the latter is connected to a tap on the potentiometer arrangement $R_{10}$—$R_{11}$ and receives from this tap a constant voltage which is thus chosen that in case the potential of point $p$ rises above the no-signal value, the diode is conductive, whereas in case the said potential falls the diode carries no current.

Via the diode the electrode of condenser C4 which is connected to it receives a higher negative potential according as the voltages at the input 3—4 increase. This negative potential is applied, via the delay network $R_1$ to $R_4$, $C_1$ and $C_2$ and the secundary of transformer TR to the grids of the amplifier tubes. Tube B1 is a variable $\mu$ tube, whereas tube B2 has a charp cut-off characteristic. By connecing these tubes in parallel a large regulation range is obtained, so that for weak signals the arrangement has a very high mutual conductance, whereas for strong signals the mutual conductance is very low. The voltage variations which develop across the choke coil L1 are rectified by diode B4. The audio frequency component of the rectified voltage obtained across the points $q$ and $r$ is absorbed by the oscillatory circuit constituted by the parallel arrangement of choke coil L2 and condenser C6. The resonance frequency of this circuit lies between 5 and 15 C./S. Consequently the impedance is very high for these frequencies, so that between grid and cathode of amplifier tube B5 a voltage is applied, which varies in syllabic rhythm. The voltage variations developing across resistance $R_{17}$ in the anode circuit of this tube are once rectified, via condenser C8 by a diode-rectifier G1. Condenser C7 constitutes a short circuit for audio frequency oscillations which might occur in the anode circuit of tube B5. The circuit of rectifier G1 goes via resistance R9, which is taken up in the cathode lead of tube B4.

In consequence of the presence of speech at the input a negative voltage with respect to the cathode is applied to the grid of tube B6. This voltage should not vary in a syllabic rhythm, however, therefore the rectified voltage is smoothed by means of condenser C9 connected in parallel to rectifier G1 and resistances R18 and R19. On arrival of a syllable series of usable level tube B6 is biassed to cut-off, so that relay S releases. This relay cannot operate in the intervals between two syllables; this is achieved by the action of the said condenser C9 and resistance R18—R19, this arrangement having a large time constant. As a result of the connection of a rectifier G2 in parallel to resistance R19 condenser C9 is quickly charged, but it is slowly discharged. The discriminator is intended to ascertain the presence of telephone currents of a certain minimum level. It is necessary, however, to equalize level variations as much as possible; the fact in that higher voltages at the points $s$ and $t$ cause a greater delay in the arrangement of C9, R18 and R19, this delay influencing in its turn the operation of relay S. By means of the AVC in the preamplifier tubes and the negative feedback in the circuits of the rectifiers B4 and G1, the desired independence of the input level is obtained. Relay S closes its contact $s^1$ in the circuit of the motor regulator so that the TMS can control the latter according as it establishes the necessity to do so.

Another embodiment of the discriminator according to the invention will be explained by means of Fig. 2b.

The signal obtained from the radio receiver is applied to the primary I of transformer TR1, primary II passing on the signal to the variable attenuator. The secondary is connected to the grids of a variable amplifier tube. As in Fig. 2a a variable $\mu$ tube has been connected in parallel with a sharp cut-off tube, with a view to the large range of levels the discriminator has to deal with. Via condenser C5 the amplified signal is applied to the diode D1. By means of half-wave rectification condenser C4 is rapidly charged, the rectified voltage being applied with some delay via R8 and C1 to the grids of tubes V1 and V2. The charge of condenser C1 takes place rather quickly, though not so quickly that the speech fluctuations would be impaired, whereas the discharge of C1 via R8 and R11 is so much delayed that in a normal conversation the amplifier retains between the words the amplification it has been automatically adjusted to. In order to obtain with a level of —40 db, as much amplification as possible the diode D1 receives a biassing voltage derived from resistor R5, so that with low levels the regulating action is suspended.

In order to obtain the syllabic frequency, the amplified signal is applied, via condenser C6 and resistor R13, the function of which will be set forth later, to the diode D2. This diode is so connected, that the other half-cycles of the A. C. voltage are rectified, so that condenser C7 is charged. The discharge of condenser C7 takes place through resistor R14. The syllabic frequency voltage developing across C7/R14 is applied via a filter consisting of R15, C8, C9, R17 to the grid of amplifier tube V3. After the amplifier tube V3 another filter has been provided, consisting of R21, C10, R22, R23, C11 and C12. The two filters together have such a frequency charactertisic, that frequencies of from 5 to 15 C./S. are allowed to pass, whereas lower and higher frequencies meet with a considerable attenuation.

The A. C. voltage energizing from the second filter is applied to the grid of the tube V4, which is arranged as a plate detector. This tube is so adjusted that the anode current only begins to flow, when the voltage has attained a value corresponding to a speech fluctuation of about 10 db, in order to prevent noise fluctuating in speech rhythm from entailing a wrong re-adjusting command. A relay S is located in the anode circuit of tube V4; this relay, shunted with condenser C13 is slow in operating as well as in releasing. It is to be noted that, in contradistinction to the embodiment of Fig. 2a the arrangement is such that relay S operates in the case of speech arriving.

The action of the diodes D3 and D4 is as follows: During a period of silence condenser C1 will discharge via resistors R8 and R11, which will lead to a larger amplification. Parasitic noises arriving under these conditions may be amplified too much during the adjustment of the preamplifier, so that condenser C7 is charged by diode D2 to a too high value, which again results in a too high voltage at the grid of amplifier tube V3. This opens the possibility for relay S to operate and give a command. In order to prevent condenser C7 from receiving a too high charge, a diode D3 has been connected in parallel to diode D2 and condenser C7. Diode D3 is given such a bias voltage from resistors R24 and R25 that at normal working voltages it is non-conductive. In consequence, no higher voltage can appear across the diode D2 than is determined by D3. In order to enhance the effectiveness of this measure, resistor R13 has been connected in series to the two diodes, which results in a still better limiting of the voltage. The limitation of the voltage appearing across diode D2 also ensures that with speech arriving, the voltage fluctuations are reduced, when the regulating amplifier has not yet reached its correct adjustment, so that relay A will operate less rapidly.

A second protection against the operation of relay A on account of disturbances is achieved by means of diode D4. The voltage obtained via transformer Tr2 from the preamplifier is rectified by diode D4, which is biased by such a voltage that with the normal operation of the whole apparatus no rectification takes place. Condenser C14 is charged by D4 and is connected to the negative grid bias of tube V4 in such a manner that the grid of this tube is rendered more negative by the operation of D4. In consequence tube V4, which is arranged as a plate detector, becomes less negative, so that the chance of operating of relay A is once more reduced.

If the period of speech is sufficiently long (e. g. 1 second or more), so that the preamplifier has the time to find its correct adjustment, the A. C. voltage on the anodes of $V_1$ and $V_2$ can no longer increase in a degree as to exceed the bias voltages of $D_3$ and $D_4$. The diodes $D_3$ and $D_4$ are put out of action, so that the discriminator gets the sensitivity necessary to energize relay A.

The arrangement and the relays of the TMS are quick operating. As a result in an interval of silence the minimum relay of the TMS will release sooner than the delayed action relay S, so that at the end of an interval of speech a command is given for increasing the speech level. In order to avoid this undesired effect the discriminator is provided with a relay T, which is quick operating and slow releasing. It is energized by the minimum relay of the TMS and corresponds to the T-relay of Fig. 2a. The delay at release is taken so long that relay S will release before relay T. In order to make the relay operate as quick as possible a resistance R30 shunted by a condenser C15 has been connected in series with the relay winding.

The TMS consists of an amplifier which controls via a rectifier the two relays M$a$ and M$i$. Fig. 3 shows by way of example an embodiment favorable for the invention.

The input, points 5 and 6, is connected via an attenuator V$z$ (Fig. 1) to the output amplifier V$s$. The voltages occurring at these points are applied via transformer TR to grid and cathode of tube B1. The voltage variations found in the anode circuit of this tube are applied by means of resistive coupling to tube B2. A rectifier G is connected to the latter by means of inductive coupling. In the circuit of rectifier G there is a resistance R13, via which the cathode current of the first tube flows. The resulting negative feedback makes the amplifier work with a great constancy. Rectifier G controls the two relays M$a$ and M$i$. C5 is a smoothing condenser. The windings of the two relays, as well as the shunt resistance across M$a$ are so chosen, that in the operating range both the relays are excited by equal numbers of ampere turns.

With an average input level relay M$i$ is energized. It releases if the level falls in such a degree that readjustment becomes necessary. In that case contact $mi$ is opened, so that relay T releases, applying voltage to terminal 1 of the motor panel.

It is clear that such an arrangement of the TMS makes it possible to keep the output level of amplifier V$s$ within an interval of say 15 db by switching in the motor when the minimum limit, or maximum limit, respectively is exceeded. Said limits can be changed by readjusting the relays. Fig. 4 shows graphically the coherence between the input level of the TMS and the relay currents and indicates at the same time the adjusting limits for a dynamic of 10, 15 and 20 db.

It will be seen from the detailed diagram (Fig. 5) of the motor panel that voltage applied to point 1, or 2, causes the operation of relay MH, or ML, respectively. In the former case—voltage applied to point 1 as a result of too low level—relay MH is energized in the following circuit: earth, point 1, winding MH, contact $m1$ III, maximum contact max, point 7, —60 v. As a result the motor is switched in in order to increase the level: earth, point 8 contact $mh_1{}^I$, armature winding M, contact $mh_2{}^I$, contact $mh^V$
field winding RB, contact $ml$ point 7, —60 v.

If voltage is applied to point 2, relay ML is energized in the following circuit: earth, point 2, winding ML, contact $mh^{III}$ minimum contact min., point 7, —60 v. Contacts of ML switch in the motor, this time, however, in an opposite direction, so that the level is decreased. The circuit runs as follows: earth, point 8, contact $ml^I$, armature winding M, contact $ml_2{}^I$, contact $ml^V$
field winding EB, resistor R8, contact $ml^V$ point 7, —60 v.

In order to avoid distortion, overload of amplifiers, etc., in consequence of a too high level, the reducing of high levels should be effected as quickly as possible. For this reason contact $ml^V$ connects a resistor R8, in series with the field winding. As a result of the weakening of the field the motor will turn at a higher speed.

As a simultaneous excitation of the two relays MH and ML, which occur in the case of rapid level changes, would result in a short-circuit of the battery voltage, contacts have been applied by which the relays break each other's circuit.

In case it turns out to be impossible to readjust the level sufficiently in an upward or downward direction, the regulator will reach its final position. If the level is too low relay MH is switched out by shaft contact max., which at the same time switches in lamp V3 and alarm relay AR. If the level is too high the shaft contact min. disconnects relay ML and switches in lamp V$_2$ and alarm relay AR. Relay AR, which operates in both cases, switches in an alarm system.

By means of the noise limiter G0 (Fig. 1) it is possible to eliminate noise from the connection during the intervals of silence by increasing by say 20 db the attenuation of an attenuator inserted in the connection; this attenuator can with advantage be controlled by the discriminator. This principle can be realized in many different ways. A favorable embodiment of the noise limiter is one in which a static relay opens or closes by means of a bridge circuit of resistors. Fig. 6 shows such an arrangement. If contant $s^2$ is in the position shown rectifier cells G3 and G4 receive a blocking voltage and rectifier cells G1 and G2 receive a passing voltage, which results in a large attenuation from TR2 to TR3. The taps on resistor R9 are placed at such points that the polarity is reversed when contact $s^2$ is closed, so that then the rectifier cells G3 and G4 get a passing voltage and rectifier cells G1 and G2 get a blocking voltage, so that the attenuation becomes small. Contact $s^2$ is a contact of the discriminator relay S. The control of the noise limiter by the discriminator secures the result that in the intervals of silence the noise is considerably weaker, which highly benefits the quality of the connection.

It is pointed that the application of the noise limiter differs from the way in which it was used in the U. S. A. patent applications Nos. 189,411 and 189,412, also in connection with the location of the automatic volume regulator in the incoming branch.

It may be noted, finally, that all the contacts in motor circuit, discriminator TMS and noise limiter are shunted by series connections of a condenser and a resistor as spark quenches and in general to eliminate disturbances.

While we have illustrated and described what we regard to be the preferred embodiment of our invention, nevertheless it will be understood that such is merely exemplary and that numerous modifications and rearrangements may be made therein without departing from the essence of the invention, we claim:

1. An automatic volume regulator consisting of an input and an output circuit, a first attenuator means for adjusting the output speech level of said regulator to a given mean value, a second attenuator means connected on the output side of said regulator for normally inserting a large value of attenuation in said output circuit to limit the line noise thereover, and discriminator apparatus to condition said first attenuator means for operation only with receipt of speech frequencies which are of a usable level at the input side of said regulator and which are of a syllabic rhythm, and to simultaneously control said second attenuator to remove said attenuation from said output circuit.

2. An automatic volume regulator consisting of an input and an output circuit, a first attenuator means for adjusting the speech level of said regulator to a given mean value, a second attenuator means connected on the output side of said regulator for normally inserting a fixed large value of attenuation in said output circuit to limit the noise thereover, discriminator apparatus for conditioning said first attenuator means for operation only with receipt of speech frequencies of a usable level at the input side of said regulator and for simultaneously controlling said second attenuator to remove said fixed large attenuation from said output circuit and substitute therefor a fixed attenuation of a low value, and a level measuring set connected to the output side of said amplifier for for measuring the output level thereof and for controlling said first attenuator means in its adjustment of said output level to said mean value following enablement thereof by said discriminator means.

3. An automatic volume regulator consisting of an input and output circuit, a first attenuator means operable to introduce attenuation into said output circuit for adjusting the output speech level of said regulator between two given values, a level measuring set connected to the output side of said regulator for measuring the output level thereof including a maximum and a minimum relay which are connected to control said first attenuator means in its adjustment of said output level between said values, a second attenuator means for normally inserting a large value of attenuation in said output circuit to limit the noise thereover, and discriminator apparatus operable to condition said first attenuator means for operation only with receipt of speech frequencies of a usable level at the input side of said regulator and to simultaneously control said second attenuator to remove said attenuation from said output circuit.

4. A regulator as set forth in claim 3 which includes an electromotor drive for operating said first attenuator means in its adjustment, and a control circuit for said motor including a first energizing circuit controlled by said maximum relay for effecting increased attenuation as required and a second energizing circuit controlled by said minimum relay and said discriminator for effecting decreased attenuation as required.

5. An automatic volume regulator consisting of an input and output circuit, a first attenuator means for adjusting the speech level over the output circuit of said regulator between two predetermined values, a second attenuator means for normally inserting a large value of attenuation in said output circuit to limit the noise thereover, a level measuring set connected to the output side of said regulator for measuring the output level thereof including a maximum relay operative to control adjustment of said first attenuator means in the event that the measured output exceeds a predetermined maximum value, and a minimum relay which is operative to effect reduction of said first attenuator means in the event that said measured output level is below a predetermined minimum value, discriminator apparatus operable to condition said first attenuator means for operation only with receipt of speech frequencies of a usable level at the input side of said regulator and to simultaneously control said second attenuator to remove said attenuation from said output circuit, and time delay means for introducing a time delay in the control of said first attenuator means by said minimum relay, which delay is sufficient to permit the operation of said discriminator apparatus to disable said first attenuator means in the event that the speech frequencies at the input side of said regulator are not of a usable level.

6. An arrangement as set forth in claim 5 in which said time delay means comprises a slow-to-release relay and which includes an energizing circuit for said first attenuator means which is completed by said time delay means after the elapse of a given period responsive to receipt of speech frequencies of a value less than said predetermined minimum.

7. An automatic volume regulator consisting of an input and output circuit, a first attenuator means for adjusting the speech level over the output circuit of said regulator between given values, discriminator apparatus operable to condition said first attenuator means for operation only with receipt of speech frequencies of a usable level at the input side of said regulator, a level measuring set for measuring the output level of said regulator and for controlling said first attenuator means in its adjustment of said output level whenever said attenuator means is conditioned for operation by said discriminator means, a second attenuator means for normally inserting a large value of attenuation in said output circuit to limit the noise thereover comprising a static relay, a bridge circuit of resistors for controlling the opening and closing of said static relay, and control means operated by said discriminator for controlling said bridge circuit in the adjustment of the attenuation in said output circuit.

8. An arrangement as set forth in claim 7 in which said discriminator apparatus includes a control relay connected to be normally operative and to be released responsive to receipt of speech frequencies of a usable level at the input side of said regulator, a first pair of contacts on said relay for controlling said first attenuator means, and a second set of contact means for controlling said second attenuator means.

9. An arrangement as set forth in claim 7 in which said second attenuator means comprises an input transformer, an output transformer; a bridge circuit of resistors, a first pair of rectifier cells, and a second pair of rectifier cells connected between said input and output transformers; a control relay controlled by said discriminator to adjust the direction of current flow through said rectifier and resistor bridge system and thereby alternatively introduce attenuation into or remove attenuation from said arrangement.

No references cited.